(12) United States Patent
Young et al.

(10) Patent No.: US 10,324,599 B2
(45) Date of Patent: Jun. 18, 2019

(54) ASSISTIVE MOVE HANDLE FOR OBJECT INTERACTION

(71) Applicant: Microsoft Technology Licensing, LLC, Redmond, WA (US)

(72) Inventors: Kerry Young, San Jose, CA (US); Elise L. Livingston, Redmond, WA (US); Thomas R. Mignone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 15/085,581

(22) Filed: Mar. 30, 2016

(65) Prior Publication Data

US 2017/0285913 A1  Oct. 5, 2017

(51) Int. Cl.
*G06F 3/0484* (2013.01)
*G06F 3/0482* (2013.01)

(52) U.S. Cl.
CPC ...... *G06F 3/04842* (2013.01); *G06F 3/04845* (2013.01)

(58) Field of Classification Search
CPC ............................ G06F 3/04842; G06F 3/0482
USPC ......................................................... 715/799
See application file for complete search history.

(56) References Cited

U.S. PATENT DOCUMENTS

| 5,736,974 | A | 4/1998 | Selker |
| 6,211,856 | B1 | 4/2001 | Choi et al. |
| 6,567,109 | B1 | 5/2003 | Todd |
| 7,302,650 | B1 * | 11/2007 | Allyn ................. G06F 3/04812 715/792 |
| 7,489,306 | B2 | 2/2009 | Kolmykov-Zotov et al. |
| 8,201,109 | B2 * | 6/2012 | Van Os ................. G06F 3/0488 715/710 |
| 8,255,830 | B2 * | 8/2012 | Ording ................. G06F 1/1626 715/810 |
| 8,451,236 | B2 * | 5/2013 | Duarte ................. G06F 3/0488 345/173 |
| 8,510,670 | B2 * | 8/2013 | Shimamura ........... G06F 3/0488 715/702 |
| 8,677,268 | B2 | 3/2014 | Capela et al. |
| 8,826,187 | B2 * | 9/2014 | Willis ................... G06F 3/0488 715/859 |

(Continued)

FOREIGN PATENT DOCUMENTS

| GB | 20090005151 A | 9/2010 |
| WO | 2000073888 A1 | 12/2000 |

OTHER PUBLICATIONS

Roudaut, et al., "TapTap and MagStick: Improving One-Handed Target Acquisition on Small Touch-screens", In Proceedings of the working conference on Advanced visual interfaces, May 28, 2008, 8 pages.

*Primary Examiner* — Daeho D Song
(74) *Attorney, Agent, or Firm* — Christopher J. Volkmann; Kelly, Holt & Christenson, PLLC

(57) ABSTRACT

User selection of a displayed object is detected. The size of the selected object is identified and compared with a move target size threshold. If the size of the selected object does not meet the move target size threshold, then a user actuatable move handle is displayed in a location displaced from the selected object, on the user interface, but visually connected to the selected object. User actuation of the move handle correspondingly moves the object on the user interface.

17 Claims, 12 Drawing Sheets

(56) References Cited

U.S. PATENT DOCUMENTS

| | | | |
|---|---|---|---|
| 9,092,130 B2 | 7/2015 | Weeldreyer et al. | |
| 9,128,604 B2* | 9/2015 | Tseng | G06F 17/24 |
| 9,146,660 B2* | 9/2015 | Jackson | G06F 3/04812 |
| 9,292,161 B2* | 3/2016 | Carter | G06F 3/04883 |
| 9,383,915 B2* | 7/2016 | Carlsson | G06F 3/04845 |
| 2004/0042684 A1* | 3/2004 | Liu | H04N 1/3873 |
| | | | 382/282 |
| 2007/0146393 A1* | 6/2007 | Feldman | G06F 3/0481 |
| | | | 345/660 |
| 2007/0209022 A1 | 9/2007 | Gourdol et al. | |
| 2007/0291007 A1* | 12/2007 | Forlines | G06F 3/0488 |
| | | | 345/173 |
| 2008/0259040 A1* | 10/2008 | Ording | G06F 3/0488 |
| | | | 345/173 |
| 2009/0048000 A1* | 2/2009 | Ade-Hall | G06F 3/0236 |
| | | | 455/566 |
| 2010/0088596 A1* | 4/2010 | Griffin | G06F 3/041 |
| | | | 715/702 |
| 2011/0016419 A1* | 1/2011 | Grosz | G06K 9/6267 |
| | | | 715/769 |
| 2011/0083104 A1 | 4/2011 | Minton | |
| 2011/0138275 A1 | 6/2011 | Yu | |
| 2011/0141031 A1* | 6/2011 | McCullough | G06F 3/0481 |
| | | | 345/173 |
| 2011/0185317 A1* | 7/2011 | Thimbleby | G06F 3/04845 |
| | | | 715/863 |
| 2011/0246875 A1* | 10/2011 | Parker | G06F 3/04845 |
| | | | 715/702 |
| 2012/0013645 A1 | 1/2012 | Hu | |
| 2013/0117711 A1* | 5/2013 | Hayes | G06F 9/451 |
| | | | 715/800 |
| 2013/0235071 A1* | 9/2013 | Ubillos | G06F 3/0484 |
| | | | 345/600 |
| 2013/0305187 A1 | 11/2013 | Phillips et al. | |
| 2013/0328938 A1* | 12/2013 | Yamaguchi | G06F 3/04883 |
| | | | 345/660 |
| 2014/0101612 A1* | 4/2014 | Jain | G06F 17/246 |
| | | | 715/815 |
| 2014/0129990 A1* | 5/2014 | Xin | G06F 3/017 |
| | | | 715/849 |
| 2014/0344753 A1* | 11/2014 | Akasaka | G06F 3/0488 |
| | | | 715/823 |
| 2014/0365958 A1* | 12/2014 | Park | G06F 3/04845 |
| | | | 715/790 |
| 2014/0372939 A1* | 12/2014 | Parker | G06F 3/0481 |
| | | | 715/799 |
| 2015/0054742 A1* | 2/2015 | Imoto | G06F 3/017 |
| | | | 345/158 |
| 2016/0110056 A1* | 4/2016 | Hong | G06F 3/04812 |
| | | | 715/768 |
| 2016/0350503 A1* | 12/2016 | Jun | G06F 3/04883 |

* cited by examiner

ASSISTIVE MOVE HANDLE FOR OBJECT INTERACTION

BACKGROUND

Computer systems are currently in wide use. Some such computer systems run applications that generate or display content. Examples of such applications include word processing applications that generate word processing documents, slide presentation applications that generate slide presentation documents, spreadsheet applications that generate spreadsheet documents, among a wide variety of others.

Such applications often generate user interfaces, on which objects can be displayed. These types of applications often provide functionality that enables a user to select a displayed object and then perform a variety of different functions on the selected object. For instance, when a user selects an object on a user interface, some applications display resizing handles which are visual display elements that can be actuated by the user (e.g., they can be "grabbed" and moved on the display screen) in order to resize the selected object. Other functionality can display a rotation handle which can be actuated by the user in order to rotate the selected object. Still other functionality allows a user to interact with (e.g., "grab" and move) a target area on the selected object, itself, in order to move the object to a different location on the display screen, and hence to a different location in the document in which it is displayed.

When a selected object is relatively small, processing user inputs with respect to the selected object can be difficult. For instance, when a user provides a user input relative to a small selected object, it can be difficult to interpret precisely what the user is attempting to do with respect to the selected object.

The discussion above is merely provided for general background information and is not intended to be used as an aid in determining the scope of the claimed subject matter.

SUMMARY

User selection of a displayed object is detected. The size of the selected object is identified and compared with a move target size threshold. If the size of the selected object does not meet the move target size threshold, then a user actuatable move handle is displayed in a location displaced from the selected object, on the user interface, but visually connected to the selected object. User actuation of the move handle correspondingly moves the object on the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
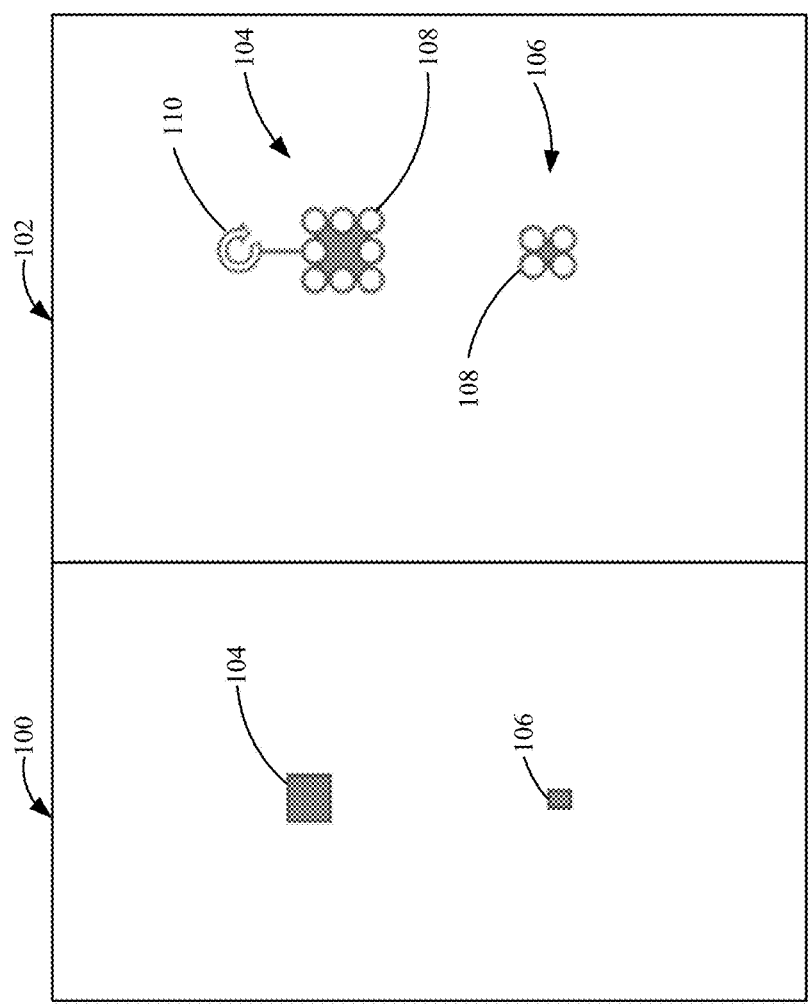
FIG. 1 shows one example of two different user interface displays, the first showing a plurality of objects that are unselected and the second showing those objects when selected.

FIG. 1 shows one example of a set of user interface displays 100 and 102. Display 100 shows two different objects 104 and 106 displayed on the user interface display. Display 102 shows objects 104 and 106, when they have been selected by a user. Depending on the type of application that is displaying objects 104 and 106, and depending upon the particular device on which they are displayed, a user can select objects 104 and 106 in a variety of different ways. For instance, the user can select them using a point and click device, such as a mouse, a trackball, a touch pad, etc. In addition, where objects 104 and 106 are displayed on a touch enabled display, then the user can select objects 104 and 106 by using touch gestures, such as by tapping them, using a stylus, etc.

It can be seen on display 102 that once objects 104 and 106 are selected, some applications also display a plurality of resizing handles (represented by the small circles 108) proximate the periphery of each of the selected objects 104 and 106. The resizing handles 108 are illustratively user actuatable elements so that the user can select and move a particular resizing handle in order to resize the corresponding object. For example, the user can select (e.g., touch or click) and drag one of the resizing handles 108 in order to resize the corresponding object.

Display 102 also shows that, in one example, a rotation handle 110 can be displayed proximate a selected object. In the example shown in display 102, rotation handle 110 is shown displaced from, but visually connected to, selected object 104. The user can actuate rotation handle 110 (such as by clicking or touching and dragging it) in order to rotate selected object 104 in a desired direction.

Figure 1A:
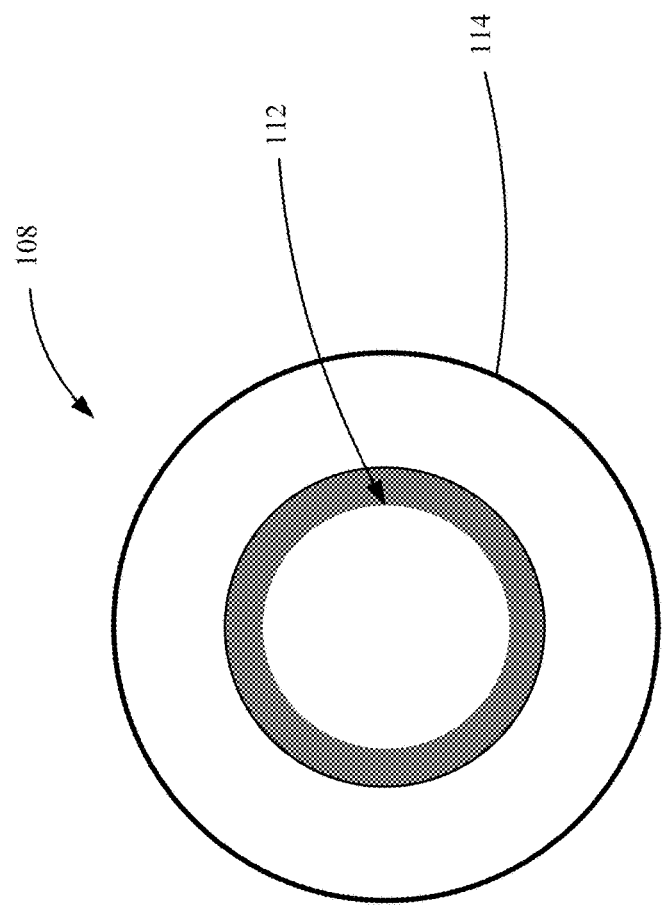
FIG. 1A illustrates a buffer area around a resizing handle.

FIG. 1A shows one example of an enlarged resizing handle 108. It can be seen that resizing handle 108 illustratively includes a displayed selection handle portion 112. This is the displayed portion of the selection handle 108. However, it is common in some applications that selection handles 108 also have a built-in buffer area 114 around them. Buffer area 114 increases the active touch size of resizing handle 108 making it easier to select and manipulate. For instance, if a user touches either the displayed portion 112 of selection handle 108, or the built-in buffer area 114 (which is not displayed) this will activate the selection handle functionality so that the user can manipulate the selection handle to resize the corresponding object.

Referring again to display 102 in FIG. 1, many applications also provide functionality so that a user can move a selected object by actuating a move target (which usually corresponds to a region around the center of the selected object) and dragging that target in the direction of the desired move. For instance, if display 102 is generated on a touch sensitive display, and the user touches the center of selected object 104, the user can drag that object on the user interface display in any desired direction to relocate selected object 104 on the display (and hence in the document in which object 104 is being displayed).

Display 102 also shows that, when the object is relatively small (such as object 106 in display 102) the resizing handles 108 are so close to one another that they make it difficult (if not impossible) for the user to actuate the move target area at the center of the selected object 106. This problem is exacerbated by the fact that, as discussed above with respect to FIG. 1A, the resizing handles 108 often have a built-in buffer area so that the buffers, when combined with one another as shown for selected object 106 in display 102, overlapping with one another, completely obscuring the move target which the user needs to touch in order to move object 106. The user is thus substantially unable to move object 106 because object 106 is so small that the resizing handles are too close to one another.

Figure 2:
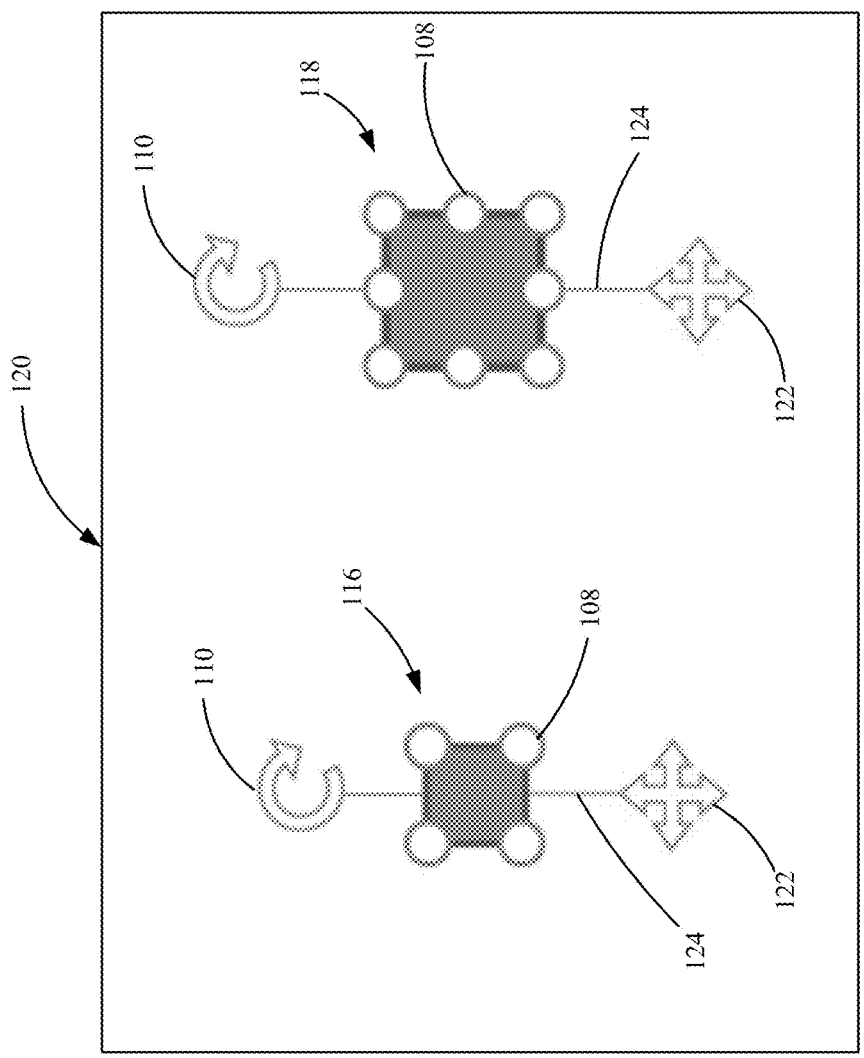
FIG. 2 shows one example of a user interface display in which selected objects have a corresponding assistive move handle displayed.

As discussed in greater detail below with respect to FIGS. 2-10, the present description addresses this by determining the size of a selected object and comparing it to a size threshold to determine whether it is so small that it can inhibit the user from effectively moving the selected object. FIG. 2 shows a user interface display 120 in which two objects 116 and 118 are displayed and selected. In the example shown in FIG. 2, once an object is selected, the size of the object is determined (such as calculated) and compared with a size threshold to determine whether the size of the object meets that threshold. If the size of the object does not meet the threshold, then an assistive move handle 122 is displayed in a position displaced from, but visually connected to, the corresponding selected object. It can be seen in FIG. 2 that the size of both selected objects 116 and 118 are smaller than the size threshold. Therefore, the assistive move handles 122 have been displayed relative to both selected objects 116 and 118. In the example shown in FIG. 2, move handles 122 are visually connected to their corresponding objects by visual connectors 124. The move handles 122 are illustratively user actuatable elements that a user can interact with (such as click or touch and drag) to move the corresponding object. Of course, the particular size and shape of move handles 122 and connectors 124, and their placement relative to the corresponding object, can vary widely, and those shown in FIG. 2 are shown for the sake of example only.

FIG. 2 also shows that, in one example, rotation handles 110 are also displayed for the selected objects 116 and 118.

Figure 3:
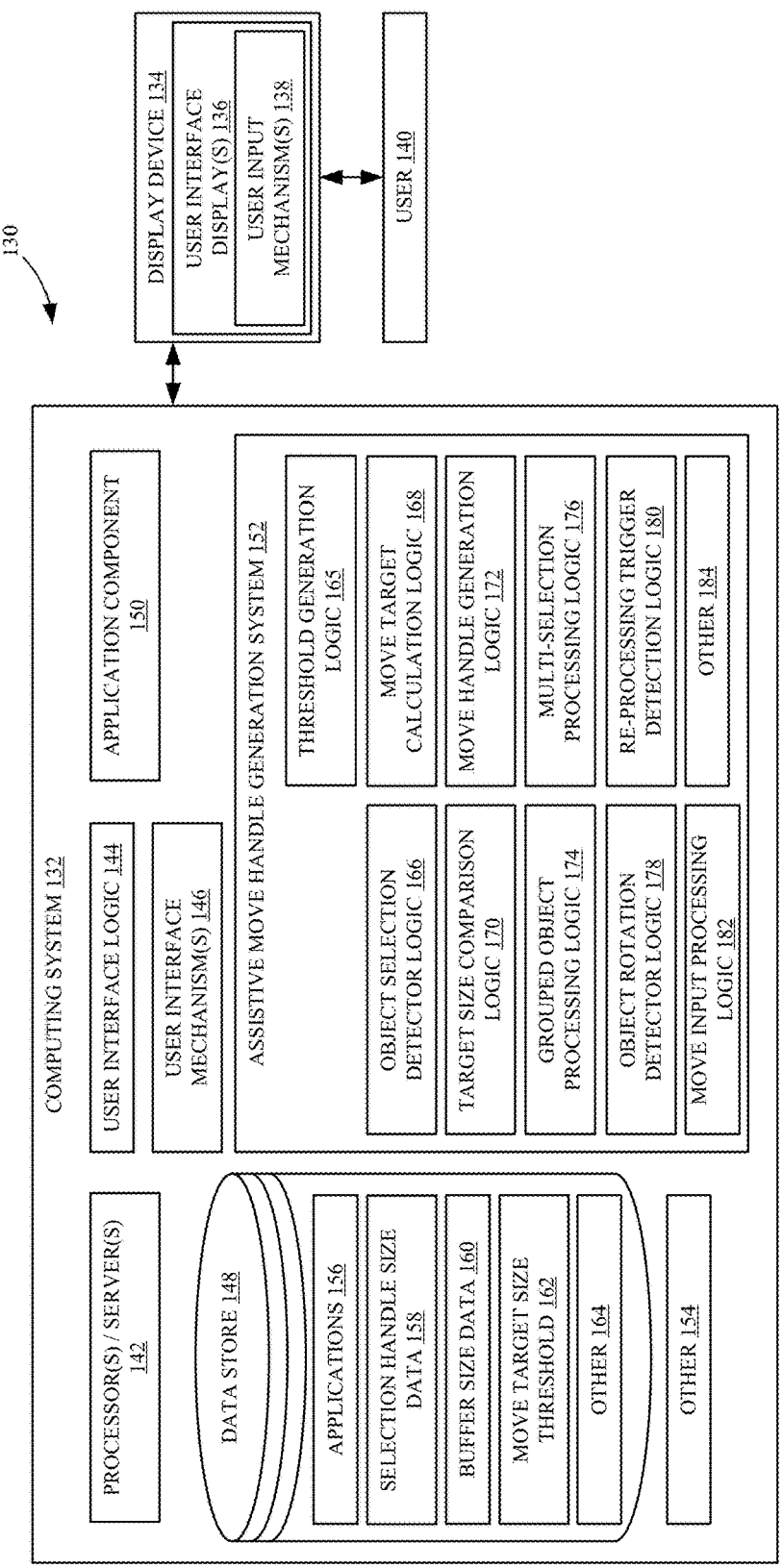
FIG. 3 is a block diagram of one example of a computing system architecture.
Figure 4:
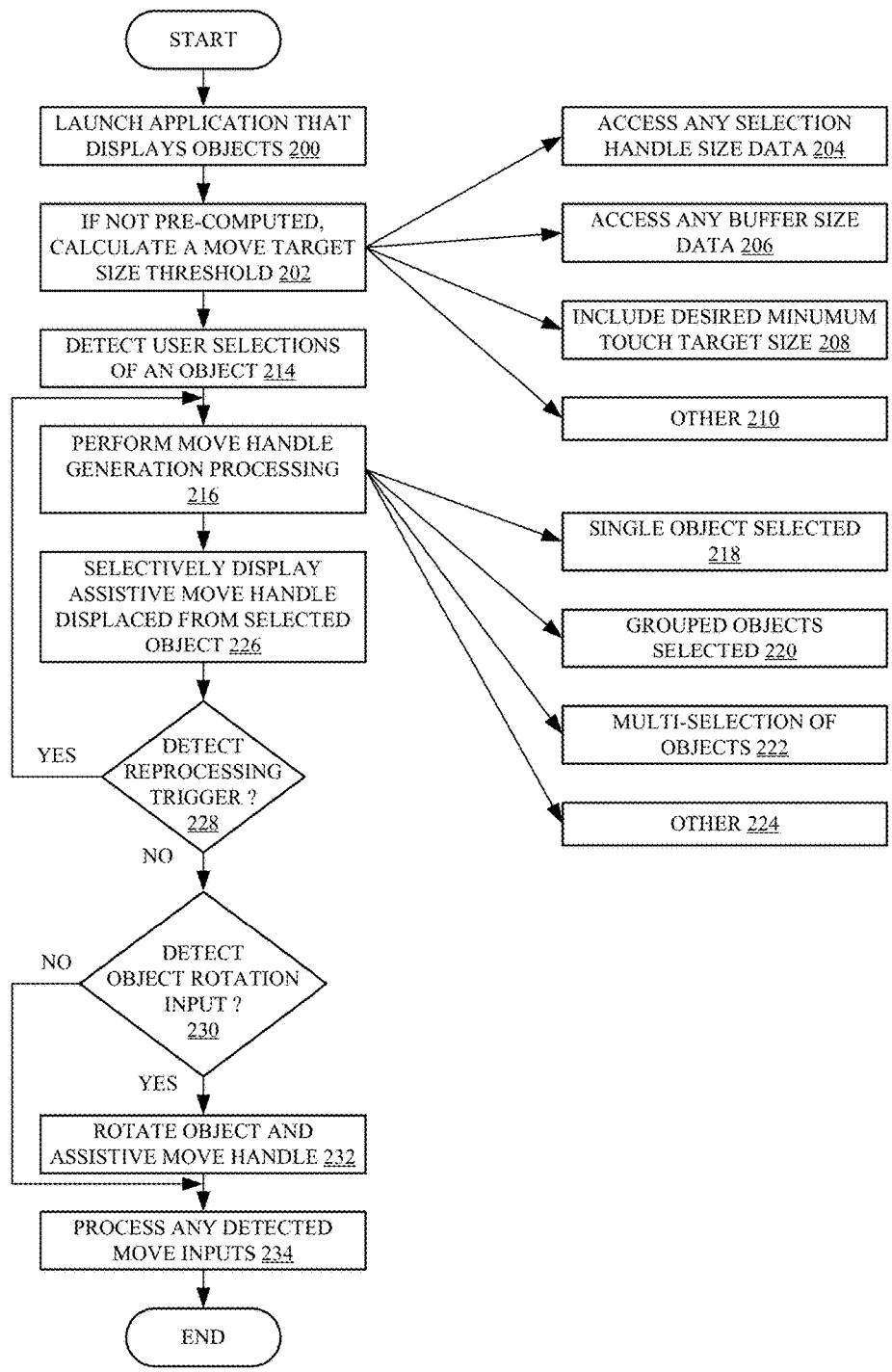
FIG. 4 is a flow diagram illustrating one example of the operation of the architecture shown in FIG. 3 in selectively displaying assistive move handles for selected objects.
Figure 5:
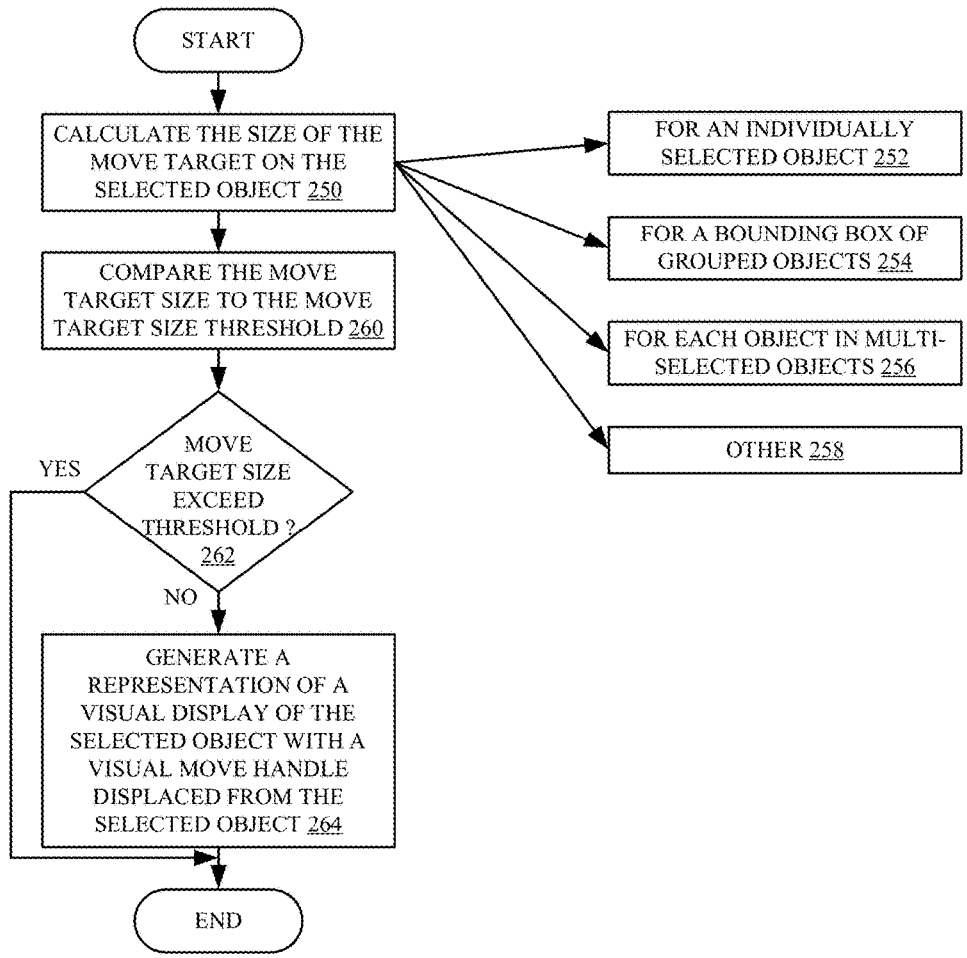
FIG. 5 is a flow diagram illustrating one example of the operation of the architecture shown in FIG. 3 in performing move handle generation processing.

FIG. 3 is a block diagram of one example of a computing system architecture 130 that can be used to generate the assistive move handles 122 and process user interaction with those handles. FIG. 4 is a flow diagram illustrating one example of the operation of architecture 130 in selectively displaying the move handles and processing user interaction with those handles. FIG. 5 is a flow diagram illustrating one example of the operation of architecture 130 in performing move handle generation processing, to determine whether the assistive move handles 122 should be displayed for a selected object, in more detail. These figures will now be described in conjunction with one another.

FIG. 3 shows that, in one example, architecture 130 includes computing system 132 that communicates with display device 134 and displays user interface displays 136. In the example illustrated, user interface displays 136 include user input mechanisms 138 for interaction by user 140. User 140 illustratively interacts with user input mechanisms 138 in order to control and manipulate computing system 132.

Computing system 132, itself, illustratively includes one or more processors or servers 142, user interface logic 144, user interface mechanisms 146, data store 148, application component 150, assistive move handle generation system 152, and it can include a wide variety of other items 154. Data store 148 can include applications 156, selection handle size data 158, buffer area size data 160, move target size threshold 162, threshold generation logic 165, and it can include a wide variety of other information 164. Assistive move handle generation system 152 can include object selection detector logic 166, move target calculation logic 168, target size comparison logic 170, move handle generation logic 172, grouped object processing logic 174, multi-selection processing logic 176, object rotation detector logic 178, re-processing trigger detection logic 180, move input processing logic 182, and it can include a wide variety of other items 184. It will be noted that assistive move handle generation system 152 can be part of applications 156 or separate therefrom. It is shown as a separate system for the sake of example only. Before describing the overall operation of architecture 130 in more detail, a brief description of some of the items in architecture 130 will first be provided.

User interface logic 144 illustratively controls user interface mechanisms 146. Mechanisms 146 can include not only display device 134 but a wide variety of other user interface mechanisms such as a microphone, speakers, buttons, a keyboard or keypad, switches, user actuable display elements, such as icons, drop down menus, and a wide variety of other mechanisms.

Application component 150 illustratively runs one or more applications 156 that can be used to generate and display content. Such applications can include, among others, word processing applications, spreadsheet applications, slide presentation applications, drawing applications, etc.

In assistive move handle generation system 152, object selection detector logic 166 detects user selection of a displayed object. Move target calculation logic 168 illustratively calculates the size of the selected object (or the move target on the selected object), and target size comparison logic 170 illustratively compares that size to a move target size threshold 162 in data store 158 (which can be calculated by threshold generation logic 165) to determine whether the selected object is larger or smaller than the threshold. If it is smaller, move handle generation logic 172 generates a move handle (such as those displayed in FIG. 2 above) for the selected object. Move input processing logic 182 processes any user inputs relative to the move target (such as a move gesture that moves the selected object using the move handle).

It may also be that the selected object is actually a set of grouped objects. In that case, grouped object processing logic 174 selectively generates a move handle for the set of grouped objects. Similarly, the user may select multiple different objects on a user interface display. In that case, multi-selection processing logic 176 selectively generates the assistive move handles. If a rotation handle is also displayed, then object rotation detector logic 178 processes any user inputs relative to the rotation handle. Further, it may be that the user provides an input so that move handle processing should be repeated (e.g., perhaps the the size of the selected object needs to be recalculated, etc.). For instance, if the user provides a zoom input that effectively enlarges or reduces the size of the selected object on the display screen, then re-processing trigger detection logic 180 detects the zoom input as an indication that the size of the selected object needs to be recalculated to determine whether the move handle needs to be displayed, based on the new size of the selected object on the display. All of these are described in greater detail below with respect to FIGS. 4 and 5.

FIG. 4 is a flow diagram illustrating one example of the overall operation of architecture 130 in selectively generating assistive move handles for selected objects. User 140 first launches an application that has functionality for displaying objects. This is indicated by block 200 in FIG. 4.

In one example, the application will have selection handle size data 158 that is indicative of the size of the selection handles that are displayed for a selected object in that application, if any. It will also illustratively include buffer size data 160 that identifies the size of any buffer region around the selection handles. If the move target size threshold 162 has not been generated, or has not been generated for this application, then threshold generation logic 165 in system 152 calculates or otherwise generates a move target size threshold. This is indicated by block 202. In doing so, it may access any selection handle size data 158. This is indicated by block 204. It may also access any buffer size data 106. This is indicated by block 206. It can include a desired minimum touch target size, as indicated by block 208. It can be calculated in other ways as well, and this is indicated by block 210.

In one example, Equation 1 below illustrates one way in which the move size target threshold can be calculated.

MOVE SIZE TARGET THRESHOLD (the minimum dimension for one side of the bounding box of a selected object)=MIN. TOUCH TARGET SIZE+2(SELECTION HANDLE RADIUS)+2(SELECTION HANDLE BUFFER SIZE)     EQ. 1

Figure 4A:
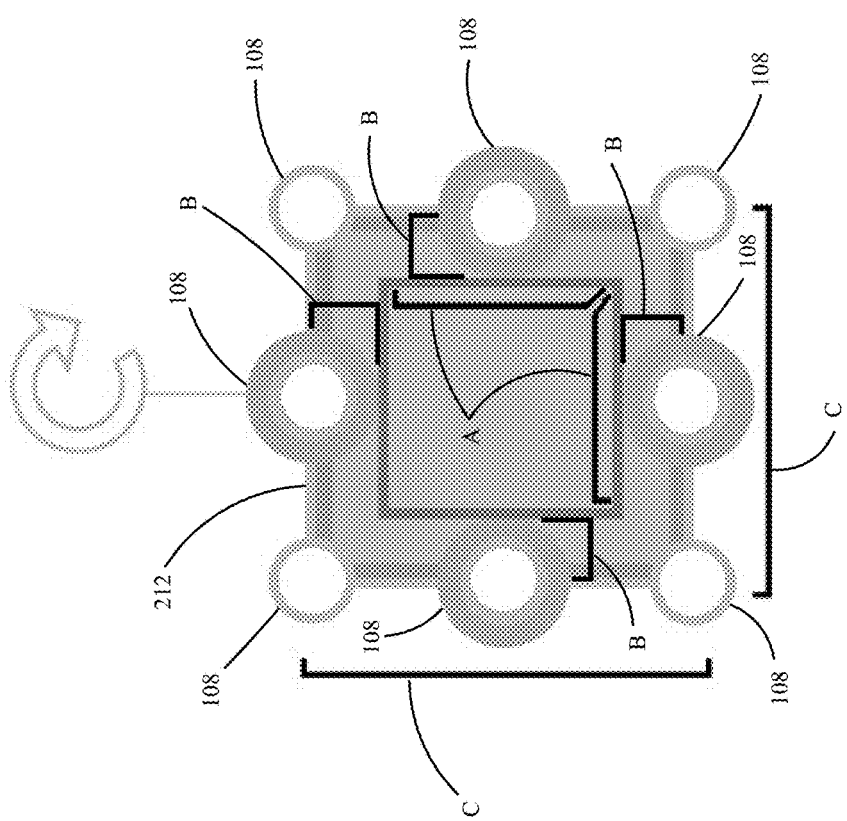
FIG. 4A shows one example of how a move target size threshold can be identified.

It can be seen that Eq. 1 includes a minimum touch target size that is desired, plus two times the radius of a resizing handle, plus two times the resizing handle buffer size. FIG. 4A illustrates this in more detail as well.

In FIG. 4A, it can be seen that a user has selected an object 212. Resizing handles 108 are thus displayed about the periphery of the selected object 212. Assume for the sake of example that the minimum desired touch target size, which may be considered as the size of a touch target that a user can easily move, is represented by a box about the center of the selected object with sides having dimensions "A" in FIG. 4A. Also, assume that the radius of resize targets 108, plus the buffer width around those resize targets, is represented by dimensions "B" in FIG. 4A. Eq. 1 thus becomes:

$C=A+2B.$     EQ. 2

It can thus be seen that the overall size of the bounding box around a selected object or group of objects needs to have sides with a dimension of at least "C" to be considered easily movable without an assistive move handle being displayed for it. This value may illustratively be chosen as a value for which a user can relatively easily touch within the bounding box of the selected object, but without also touching or activating a selection handle 108.

In one example, the minimum touch target (or move target) dimension represented by A in FIG. 4A is chosen to be 9 mm. Also, in one example, an application that displays resize targets 108 displays them with a radius of 1.5 mm and a buffer width of 4 mm. Thus, in one example, the minimum size target threshold can be calculated as shown below in equation 3.

$C=9\text{ mm}+2(1.5\text{ mm}+4\text{ mm})=20\text{ mm}$     EQ. 3

In this example, a selected object, or a set of grouped objects, must have a bounding box that is no smaller than 20 mm by 20 mm, or it will be considered as being not easily movable by the user, in which case an assistive move handle will be displayed. Of course, these measurements are only examples and others can be used as well.

Referring again to the flow diagram of FIG. 4, it is now assumed that, as illustrated at block 202, a move target size threshold has been calculated for the current application. It may be stored as move target size threshold 162 in data store 148.

At some point, object selection detector logic 166 in system 152 (shown in FIG. 3) will detect that the user has selected an object that is currently displayed. This is indicated by block 214 in FIG. 4.

Assistive move handle generation system 152 then performs move handle generation processing to determine whether an assistive move handle needs to be displayed for the selected object. Performing the move handle generation processing is indicated by block 216 in FIG. 4. Again, this can be performed if the user has selected a single object, as indicated by block 218. It can also be performed if the user has selected a set of grouped objects, as indicated by block 220. Further, it can be performed if the user has selected multiple objects, as indicated by block 222. It can be performed in other ways as well, and this is indicated by block 224. FIG. 5 below is a flow diagram illustrating one example of how system 152 can perform this processing, in more detail, and this will be discussed later.

System 152 then selectively displays an assistive move handle, displaced from the selected object, but visually attached to that object, based upon the processing performed at block 216. Selectively displaying the assistive move handle is indicated by block 226 in FIG. 4.

Re-processing trigger detection logic 180 in system 152 may then detect a re-processing trigger This is indicated by block 228. The trigger may be that the user is zooming into or out of the display where the selected object is shown. The re-processing trigger may also be that the user has selected an individual object from a set of grouped objects, or that the user originally selected a single object but has now selected multiple objects on a user interface display. Any of these triggers, or others, may cause system 152 to again perform the move handle generation processing indicated by block 216.

Also, at any point in the processing, object rotation detector logic 178 may detect that the user is interacting with a rotation handle in order to rotate the selected object. If so, then logic 178 rotates the object on the user interface display, based on the user input. When the object is rotated, any assistive move handle that is displayed for that object is also rotated. Detecting an object rotation input and rotating the object and the assistive move handle is indicated by blocks 230 and 232 in FIG. 4.

Once an assistive move handle is displayed for a selected object, the user may interact with that object in order to move the object. For instance, the user may touch and drag the assistive move handle in a desired direction, in order to move the object on the user interface display, and hence within the document in which it is displayed. Move input processing logic 182 detects and processes any move inputs. This is indicated by block 234 in FIG. 4.

Before proceeding further with the description, it will be noted that the size of the move target that is compared to the move target size threshold can be represented in a number of different ways. For instance, it can be represented by the dimension of one side of the bounding box that bounds the object. It can also be represented by the dimension of two sides of the bounding box. It can be represented by the area of the bounding box, or in other ways. The units for the measurement or calculation can be in pixels, square pixels, mm, mm$^2$ inches, square inches, etc. These are examples only.

FIG. 5 is a flow diagram illustrating one example of the operation of architecture 130 (shown in FIG. 3) in performing move handle generation processing (as illustrated by block 215 in FIG. 4), in more detail. It is assumed for the sake of FIG. 5 that move target size threshold 162 has already been generated, and that the user has selected an object on a user interface display in a running application. Move target calculation logic 168 then calculates the size of the move target on the selected object. In one example, this is done by calculating the size (or a dimension of one or more sides) of the overall bounding box for the selected object. This is indicated by block 250 in FIG. 5.

This can be done in a variety of different ways. In one example, the number of pixels that make up the dimensions of the bounding box of the selected object is identified and converted into a length measurement. Also, the particular bounding box for which the size measurement is generated to identify the size of the move target can vary. For instance, where the user has selected an individual object on the user interface display, then the size of the bounding box (or one or more sides of the bounding box) for the individual object is calculated. This is indicated by block 252. Where the user has selected a set of grouped objects, then the size (or one or more side dimensions) of the bounding box of the grouped objects is calculated. This is indicated by block 254. Where the user has selected multiple different objects on the user interface display, then the size (or one or more side dimensions) of the bounding box for each of those selected objects in individually calculated. This is indicated by block 256. The size of the move target for the selected object can be calculated in other ways as well, and this is indicated by block 258.

The measurements calculated to determine the size of the move target, and the corresponding threshold, can be calculated in other ways as well. For instance, instead of calculating the overall size of one or more sides of the bounding box for the selected object, the actual area of the move target, around the center of the selected object itself, and between the re-sizing handles, may be calculated. In such an example, it may be that the overall size of one or more sides of the bounding box of the selected object is first calculated, and then the size of the resizing handles, along with their buffers, is subtracted from the overall size of the one or more sides of the bounding box. In any case, the size of the move target for the selected object is calculated or otherwise obtained.

Target size comparison logic 170 then compares the move target size that has been calculated for the selected object to the move target size threshold. This is indicated by block 260 in FIG. 5.

If the move target size for the selected object exceeds the threshold value, then this means that the selected object has been deemed sufficiently large that it can easily be movable by the user, without interfering with the resize targets. Thus, no assistive move handle is to be displayed. This is indicated by block 262 in FIG. 5.

If, however, at block 262, it is determined that the move target size for the selected object does not exceed the move target size threshold 162, then an assistive move handle can be generated for the selected object. In that case, move handle generation logic 172 generates a visual display of the selected object, with a visual move handle displaced from the selected object, but visually attached to, or otherwise associated with, the selected object. This is indicated by block 264. The representation of the visual display with the assistive move handle is then provided to user interface logic 154 which controls the display device 134 in order to display the selected object with the assistive move handle.

Again, as discussed above with respect to block 250, it may be that the user has initially selected a set of grouped objects, but then the user drills down into that group to select an individual object within that group. In that case, grouped object processing logic 174 causes move target calculation logic 168 to calculate, at block 250, the size of the move target for the individual object that has now been selected. Similarly, if multiple objects have been selected by the user, then multi-selection processing logic 176 controls move target calculation logic 168 to calculate the size of the move target for each of the selected objects, and it also controls comparison logic 170 and move handle generation logic 172 to compare the size of each of those move targets with the target threshold and selectively generate the assistive move handle for the corresponding selected objects.

It can thus be seen that the present description improves computing system 132, itself. The computing system will be much more accurate in interpreting user inputs. For instance, for small objects, computing system 132 will now be much more accurate in determining whether a user is attempting to move an object, or is attempting to resize the object, or is attempting some other operation. This leads to much greater accuracy, and it also reduces user frustration. Similarly, computing system 132 greatly enhances the user interface display.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
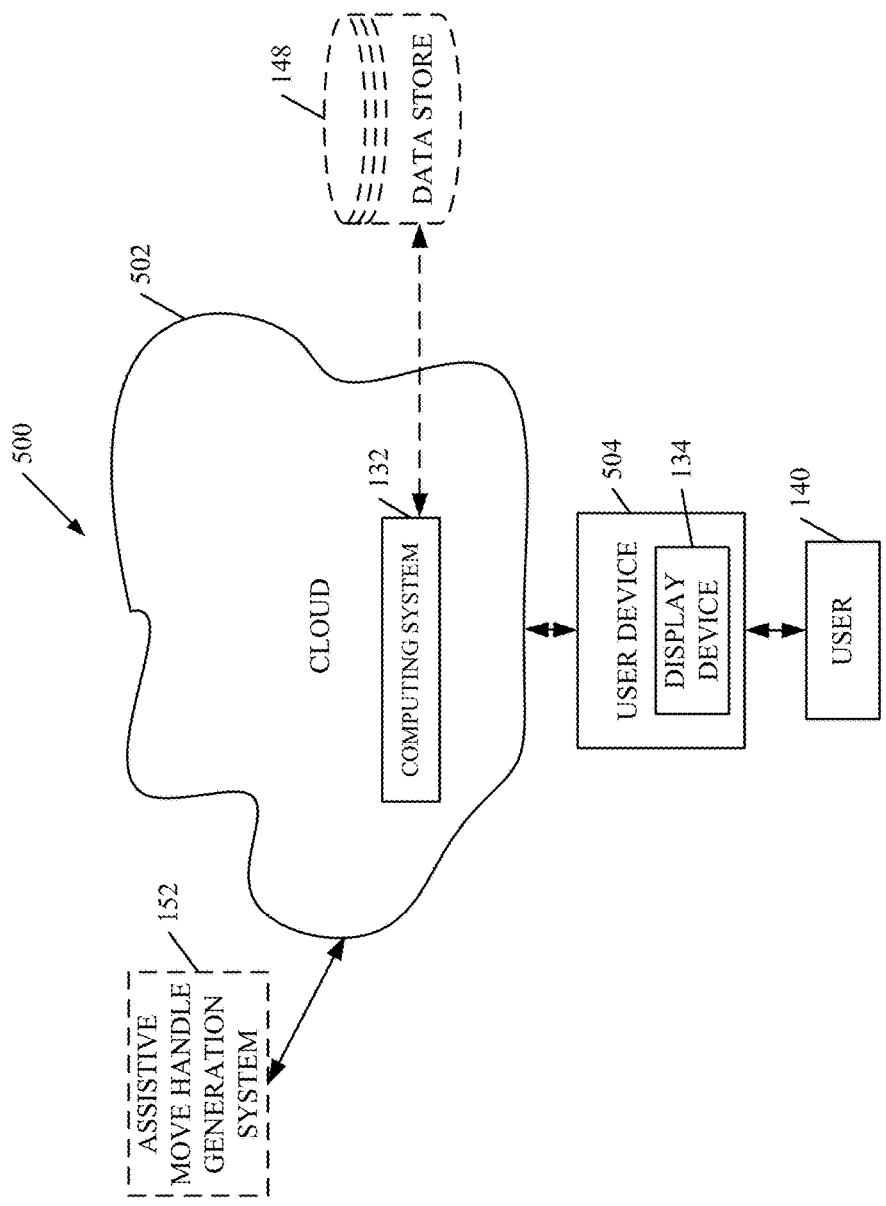
FIG. 6 is a block diagram of one example of the architecture shown in FIG. 3, deployed in a cloud computing architecture.

FIG. 6 is a block diagram of architecture 130, shown in FIG. 3, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 130 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 3 and they are similarly numbered. FIG. 6 specifically shows that computing system 132 can be located in cloud 502 (which can be public, private, or a combination where portions are public while others are private). Therefore, user 140 uses a user device 504 that includes display device 134 to access those systems through cloud 502.

FIG. 6 also depicts another example of a cloud architecture. FIG. 6 shows that it is also contemplated that some elements of computing system 132 can be disposed in cloud 502 while others are not. By way of example, data store 148 can be disposed outside of cloud 502, and accessed through cloud 502. In another example, assistive move handle generation system 152 can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 130, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
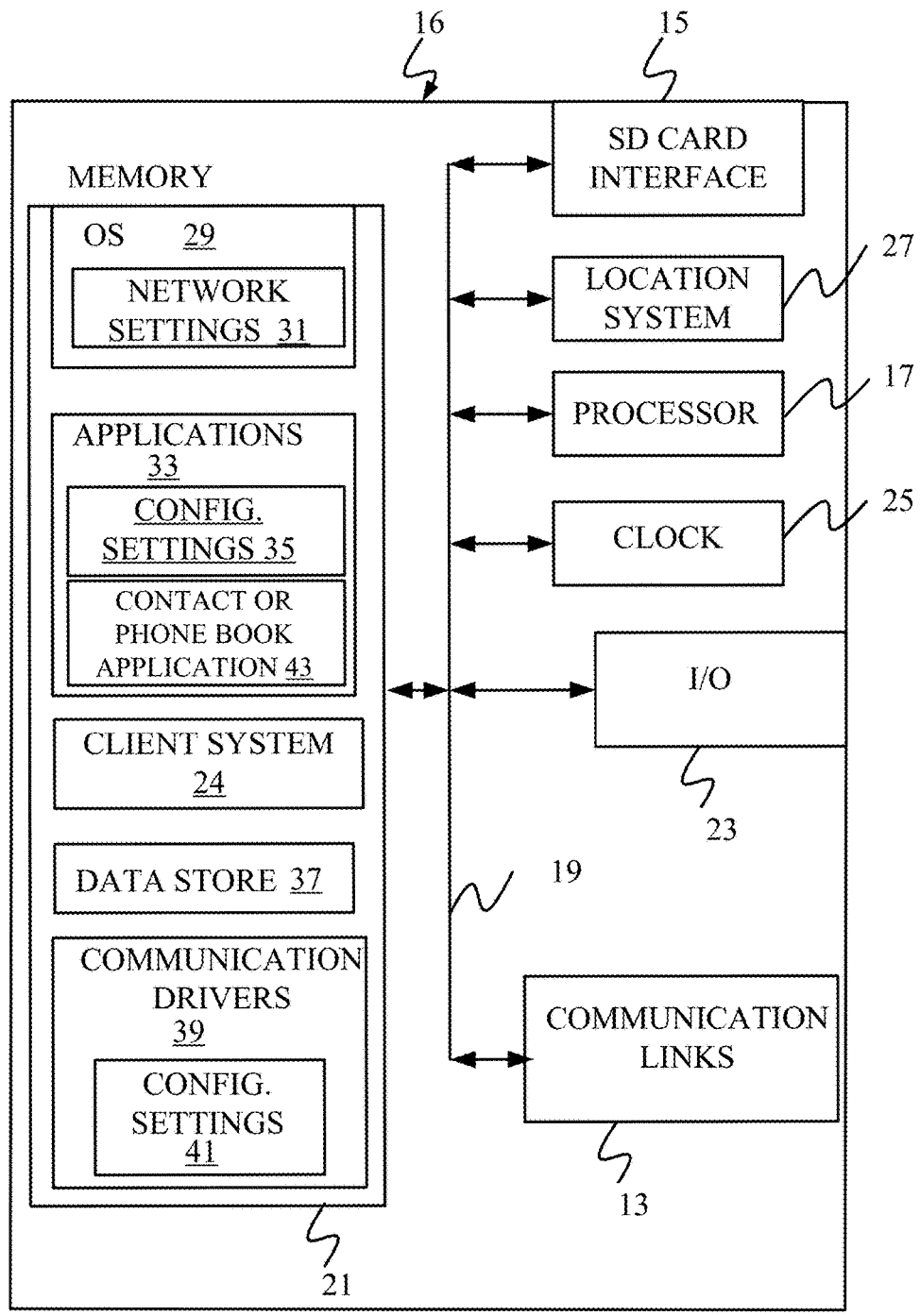
FIGS. 7-9 show various examples of mobile devices that can be used in the architectures shown in the previous figures.
Figure 8:
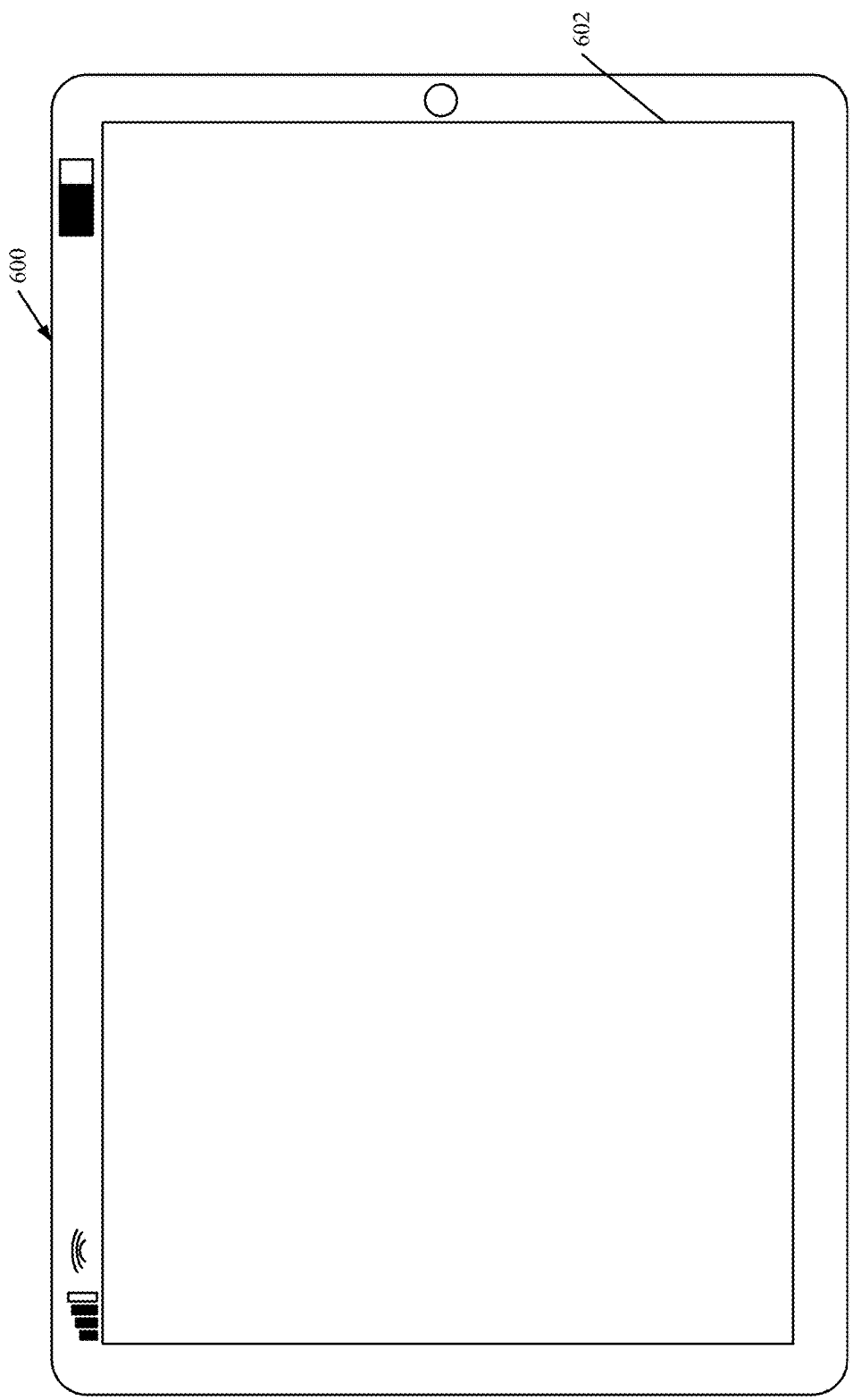
Figure 9:
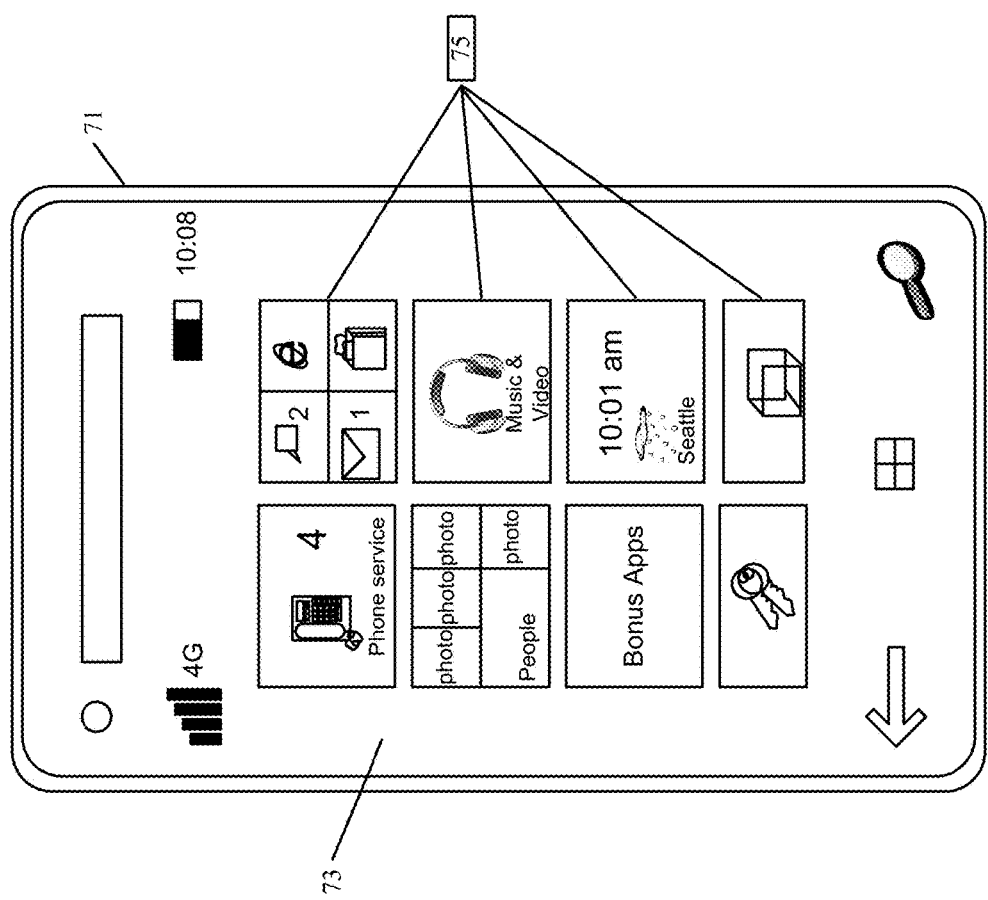

FIG. 7 is a simplified block diagram of one illustrative example of a handheld or mobile computing device that can be used as a user's or client's hand held device 16 (which can have computing system 132 on it or can be user device 504), in which the present system (or parts of it) can be deployed. FIGS. 8-9 are examples of handheld or mobile devices.

FIG. 7 provides a general block diagram of the components of such a client device 16 that can run components of architecture 130 or that interacts with architecture 130, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processor 142 from FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16.

This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 130. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
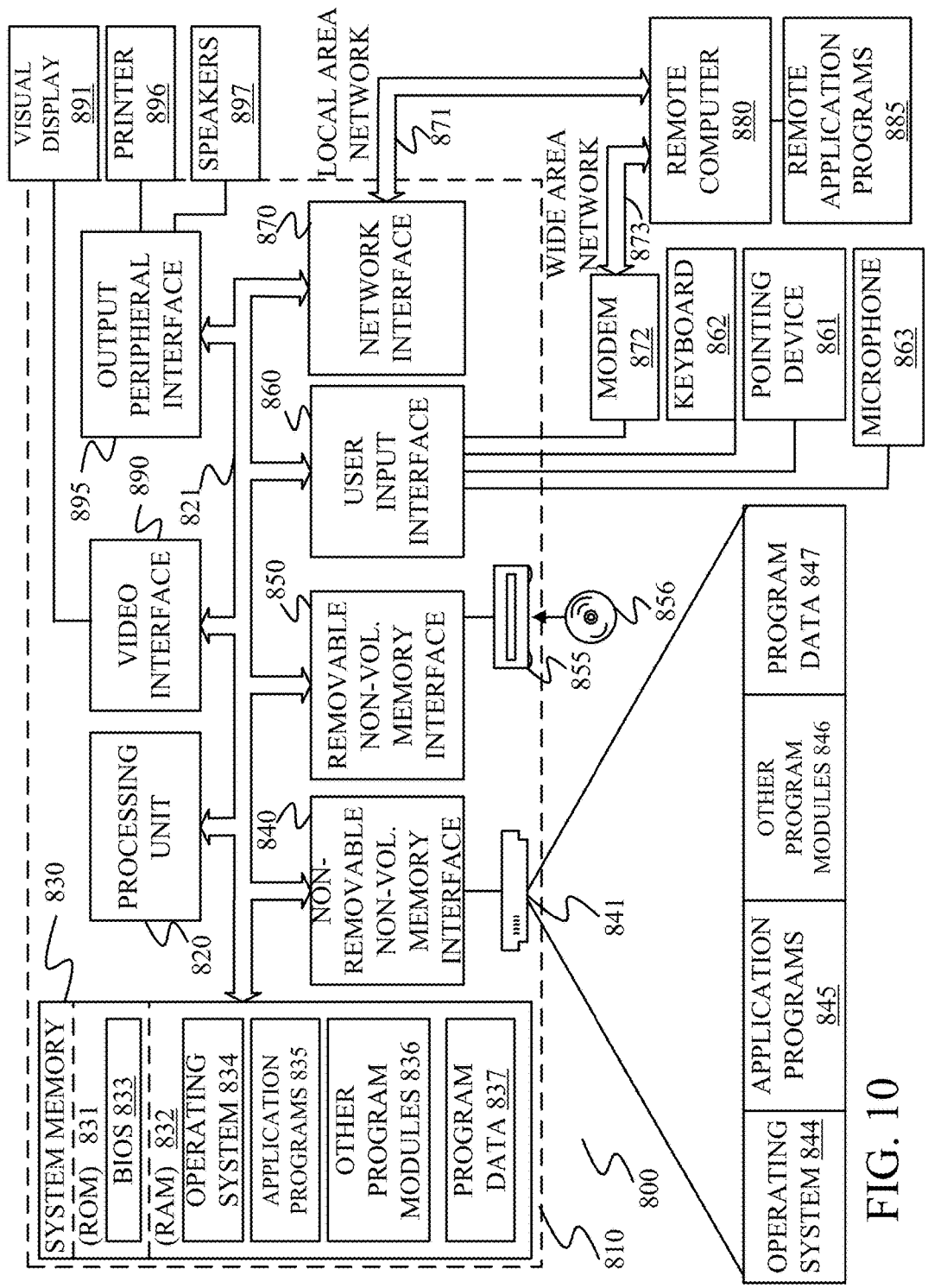
FIG. 10 is a block diagram of one example of a computing environment that can be used in the architectures shown in the previous figures.

FIG. 10 is one example of a computing environment in which architecture 130, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers 142), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 3 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are examples and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
an application component that runs an application that displays an object on a user interface display;
object selection detector logic that detects user selection of the displayed object, as a selected object; and
a move handle generation system that selectively displays a move handle display element, displaced from the selected object, based on a size of the selected object, the move handle display element being user actuatable to move the selected object on the user interface display.

Example 2 is the computing system of any or all previous examples wherein the move handle generation system is configured to display the move handle display element with a visual connection element visually connecting the move handle display element to the selected object.

Example 3 is the computing system of any or all previous examples wherein the move handle generation system comprises:
move target calculation logic configured to calculate the size of the selected object.

Example 4 is the computing system of any or all previous examples wherein the move handle generation system comprises:
target size comparison logic that compares the size of the selected object to a move target size threshold; and
move handle generation logic that generates a representation of the move handle display element based on the comparison, by the target size comparison logic, indicating that the size of the selected object fails to meet the target size threshold.

Example 5 is the computing system of any or all previous examples wherein the application displays a set of re-size handles for the selected object, the re-size handles each having an active area that includes a buffer area disposed about a visual periphery of the re-size handles, and further comprising:
threshold generation logic configured to generate the target size threshold based on a size of the re-size handles and a size of the buffer area.

Example 6 is the computing system of any or all previous examples wherein the selected object comprises a selected group of objects, move handle generation system comprising:
grouped object processing logic configured to detect user selection of the group of objects, the move target calculation logic being configured to calculate the size of the selected object as a size of a bounding box of the selected group of objects.

Example 7 is the computing system of any or all previous examples wherein the grouped object processing logic is configured to detect user selection of an individual object in the group of objects and to indicate to the target calculation logic that the individual object is the selected object.

Example 8 is the computing system of any or all previous examples wherein the move handle generation system comprises:

multi-selection processing logic configured to detect user selection of a plurality of individual objects on the user interface display, the move target calculation logic being configured to calculate a size of each of the selected, individual objects.

Example 9 is the computing system of any or all previous examples wherein the target size comparison logic is configured to compare the size of each of the selected, individual objects to the move target size threshold, and wherein the move handle generation logic is configured to generate a representation of the move handle display element for each of the selected, individual objects for which the size of the selected, individual object fails to meet the target size threshold.

Example 10 is the computing system of any or all previous examples wherein the move handle generation system comprises:

re-processing trigger detection logic configured to detect a re-processing trigger and, in response, provide a re-processing signal to the move target calculation logic, the move target calculation logic recalculating the size of the selected object in response to the re-processing signal.

Example 11 is the computing system of any or all previous examples wherein the re-processing trigger detection logic is configured to detect, as a re-processing trigger, a zoom user input to zoom the user interface display in or out relative to the selected object.

Example 12 is the computing system of any or all previous examples and further comprising:

move input processing logic configured to detect user interaction with the move handle display element and to move the selected object on the user interface display based on the detected user interaction.

Example 13 is the computing system of any or all previous examples and further comprising:

a user interface display mechanism, on which the user interface display is displayed, comprising one of a touch sensitive display on which the user selects the selected object with a touch gesture, and a display screen on which the user selects the selected object with a point and click device.

Example 14 is a computer implemented method, comprising:

running an application that displays an object on a user interface display;

detecting user selection of the displayed object, as a selected object; and selectively displaying a move handle display element, displaced from the selected object on the user interface display and visually connected to the selected object with a visual connection element, based on a size of the selected object, the move handle display element being user actuatable to move the selected object on the user interface display.

Example 15 is the computer implemented method of any or all previous examples wherein selectively displaying the move handle display element comprises:

calculating the size of the selected object;
comparing the size of the selected object to a move target size threshold; and generating a representation of the move handle display element based on the comparison indicating that the size of the selected object fails to meet the target size threshold.

Example 16 is the computer implemented method of any or all previous examples wherein the application displays a set of re-size handles for the selected object, the re-size handles each having an active area that includes a buffer area disposed about a visual periphery of the re-size handles, and further comprising:

generating the target size threshold based on a size of the re-size handles and a size of the buffer area.

Example 17 is the computer implemented method of any or all previous examples wherein detecting user selection of the displayed object comprises:

detecting user selection of a selected group of objects, and wherein calculating the size of the selected object comprises calculating a size of a bounding box of the selected group of objects.

Example 18 is the computer implemented method of any or all previous examples wherein detecting user selection of the displayed object comprises:

detecting user selection of a plurality of individual objects on the user interface display, and wherein calculating the size of the selected object comprises calculating a size of each of the selected, individual objects.

Example 19 is the computer implemented method of any or all previous examples wherein comparing the size of the selected object to the move target size threshold comprises:

comparing the size of each of the selected, individual objects to the move target size threshold, and wherein the generating a representation of the move handle display element comprises generating a representation of the move handle display element for each of the selected, individual objects for which the size of the selected, individual object fails to meet the target size threshold.

Example 20 is a computing system, comprising:

an application component that runs an application that displays an object on a user interface display;

object selection detector logic that detects user selection of the displayed object, as a selected object;

move target calculation logic configured to calculate the size of the selected object;

target size comparison logic that compares the size of the selected object to a move target size threshold; and move handle generation logic that generates a representation of the move handle display element based on the comparison, by the target size comparison logic, indicating that the size of the selected object fails to meet the target size threshold, the move handle display element being user actuatable to move the selected object on the user interface display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computing system, comprising:
at least one processor; and
memory storing instructions executable by the at least one processor, wherein the instructions, when executed, configure the computing system to:
run an application that displays an object on a user interface display;

detect user selection of the displayed object, as a selected object, wherein the user interface display includes a re-size user interface control having an active area that is actuatable to re-size the selected object;

generate a target size threshold based on a size of the active area of the re-size user interface control;

determine that the selected object has a size that is below the target size threshold;

based on the determination, modify the user interface display to add a move handle display element that is associated with, and displaced from, the selected object on the user interface display and visually connected to the selected object with a visual connection element; and based on user actuation of the move handle display element, correspondingly move the selected object, having the size that is below the target size threshold, on the user interface display.

2. The computing system of claim 1 wherein the re-size user interface control comprises a re-size handle, the active area comprises: a display element that visually represents the re-size handle, and a buffer area disposed about a visual periphery of the display element, and the instructions configure the computing system to generate the target size threshold based on a size of the display element and a size of the buffer area.

3. The computing system of claim 1 wherein the application displays a set of re-size handles for the selected object, the re-size handles each having an active area that includes a buffer area disposed about a visual periphery of the re-size handles, and the instructions configure the computing system to generate the target size threshold based on a size of the re-size handles and a size of the buffer area.

4. The computing system of claim 1 wherein the selected object comprises a selected group of objects, and the instructions configure the computing system to detect user selection of the group of objects; and calculate the size of the selected object as a size of a bounding box of the selected group of objects.

5. The computing system of claim 4 wherein the instructions configure the computing system to detect user selection of an individual object in the group of objects.

6. The computing system of claim 1 wherein the instructions configure the computing system to detect user selection of a plurality of individual objects on the user interface display; and calculate a size of each of the selected, individual objects.

7. The computing system of claim 6 wherein the instructions configure the computing system to:
compare the size of each of the selected, individual objects to the move target size threshold; and
generate a representation of the move handle display element for each of the selected, individual objects for which the size of the selected, individual object fails to meet the target size threshold.

8. The computing system of claim 1 wherein the instructions configure the computing system to detect a re-processing trigger and, in response, recalculate the size of the selected object.

9. The computing system of claim 8 wherein the instructions configure the computing system to detect, as a re-processing trigger, a zoom user input to zoom the user interface display in or out relative to the selected object.

10. The computing system of claim 1 wherein the instructions configure the computing system to:
display a user interface display mechanism on one of:
a touch sensitive display on which the user selects the selected object with a touch gesture, or
a display screen on which the user selects the selected object with a point and click device.

11. A computer implemented method, comprising:
running an application that displays an object on a user interface display;
detecting user selection of the displayed object, as a selected object;
displaying, on the user interface display, a re-size user interface control having an active area that is actuatable to re-size the selected object;
generating a target size threshold based on a size of the active area of the re-size user interface control;
determining that the selected object has a size that is below the target size threshold;
based on the determination, modifying the user interface display to add a move handle display element, which is associated with and displaced from the selected object, on the user interface display, wherein the move handle display element is visually connected to the selected object with a visual connection element; and
based on user actuation of the move handle display element, correspondingly moving the selected object, having the size that is below the target size threshold, on the user interface display.

12. The computer implemented method of claim 11 wherein the re-size user interface control comprises a re-size handle, the active area comprises:
a display element that visually represents the re-size handle, and
a buffer area disposed about a visual periphery of the display element, and
the target size threshold is based on a size of the display element and a size of the buffer area.

13. The computer implemented method of claim 11 wherein the application displays a set of re-size handles for the selected object, the re-size handles each having an active area that includes a buffer area disposed about a visual periphery of the re-size handles, and further comprising:
generating the target size threshold based on a size of the re-size handles and a size of the buffer area.

14. The computer implemented method of claim 12 wherein detecting user selection of the displayed object comprises:
detecting user selection of a selected group of objects, and wherein calculating the size of the selected object comprises calculating a size of a bounding box of the selected group of objects.

15. The computer implemented method of claim 12 wherein detecting user selection of the displayed object comprises:
detecting user selection of a plurality of individual objects on the user interface display, and wherein calculating the size of the selected object comprises calculating a size of each of the selected, individual objects.

16. The computer implemented method of claim 15 wherein comparing the size of the selected object to the move target size threshold comprises:
comparing the size of each of the selected, individual objects to the move target size threshold, and wherein the generating a representation of the move handle display element comprises generating a representation of the move handle display element for each of the selected, individual objects for which the size of the selected, individual object fails to meet the target size threshold.

17. A computing system, comprising:
at least one processor; and
memory storing instructions executable by the at least one processor, wherein the instructions, when executed, configure the computing system to:
- run an application that displays an object on a user interface display;
- detect user selection of the displayed object, as a selected object, wherein the user interface display includes a re-size user interface control having an active area that is actuatable to re-size the selected object;
- generate a move target size threshold based on a minimum touch target size and a size of an active area of the re-size user interface control;
- calculate a size of a move target area for the selected object;
- compare the size of the move target area for the selected object to the move target size threshold; and
- based on the comparison, determine that the size of the move target area for the selected object is below the move target size threshold;
- based on the determination, generate a representation of the move handle display element that is associated with, and displaced from, the selected object; and
- based on user actuation of the move handle display element, correspondingly move the selected object, having the size that is below the move target size threshold, on the user interface display.

* * * * *